D. F. CRAWFORD.
AUTOGRAPH ATTACHMENT.
APPLICATION FILED FEB. 25, 1916.
1,232,771.
Patented July 10, 1917.
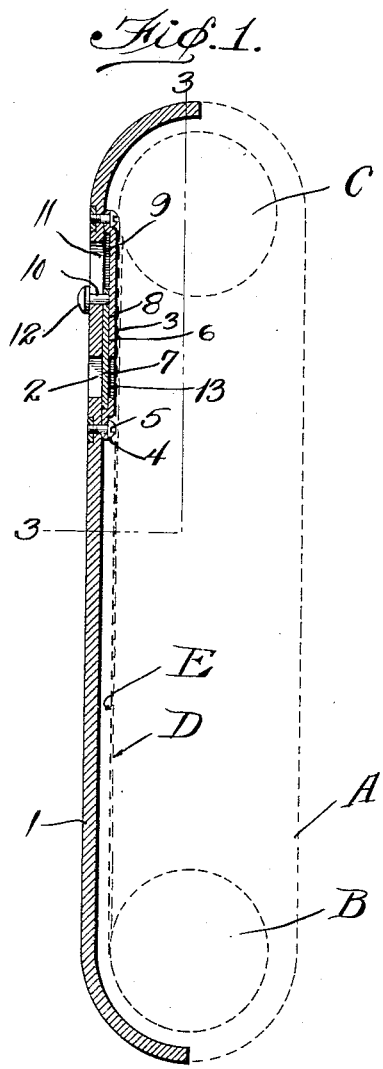
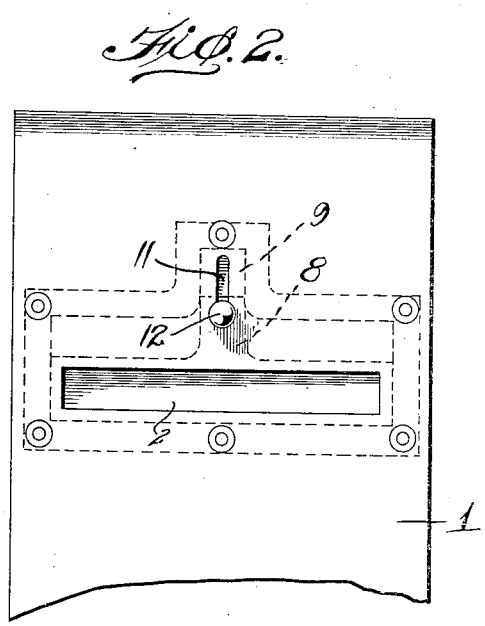
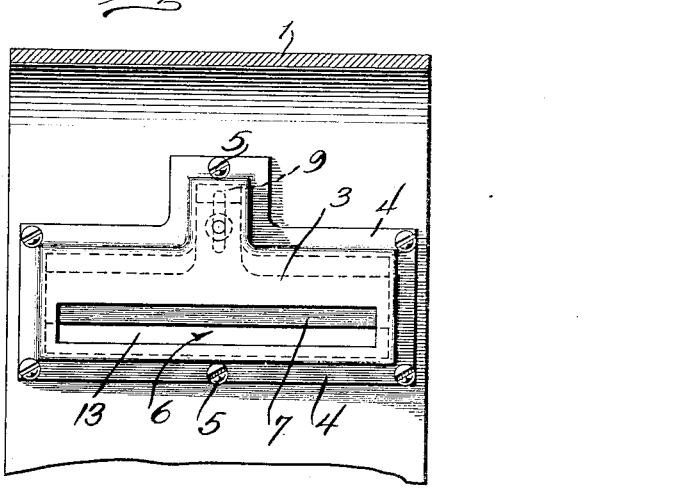
WITNESSES
H. P. Harwood
Wm. H. Mulligan
INVENTOR
David F. Crawford
BY Richard B. Owen.
ATTORNEY

UNITED STATES PATENT OFFICE.

DAVID F. CRAWFORD, OF BETHEL, CONNECTICUT.

AUTOGRAPH ATTACHMENT.

1,232,771.      Specification of Letters Patent.      Patented July 10, 1917.

Application filed February 25, 1916. Serial No. 80,452.

*To all whom it may concern:*

Be it known that I, DAVID F. CRAWFORD, a citizen of the United States, residing at Bethel, in the county of Fairfield and State of Connecticut, have invented certain new and useful Improvements in an Autograph Attachment, of which the following is a specification.

This invention relates to autograph attachments for a camera and the primary object of the invention is to provide an attachment for a camera whereby access to the paper covering for the sensitized film of the camera may be facilitated so that the autographer may scratch or impress his signature upon the paper covering of the film to allow the light to reach the film and cause the signature to be permanently impressed thereon.

The invention further aims to provide an attachment of this character which will consist of comparatively few parts and which will be arranged upon the inner wall of the back of the camera so that no unsightly mechanism will appear on the outside of the camera casing, it being only necessary to provide an elongated slot for the signature and a smaller slot through which the shutter may be operated.

For a full description of the invention and the advantages and merits thereof, reference is to be had to the following description and the accompanying drawings, wherein is illustrated the preferred form of my invention, in which, Figure 1 is a vertical section through the back wall of a camera casing showing the device attached thereto.

Fig. 2 is a rear elevation of the camera showing the attachment in dotted lines.

Fig. 3 is a vertical section on the line 3—3 of Fig. 1.

For purposes of illustration the dotted lines have been employed to designate the front wall A of the camera casing and the film rollers B and C around which the film D is wrapped and the film is provided with the usual paper covering E, both the film and the paper covering being shown, for the purposes of illustration, by single dotted lines. The back wall 1 of the casing is provided with an elongated transversely extending slot 2 which is of a width sufficient to allow the formation of the ordinary letters of the alphabet which are employed in the signature. On the inside face of the wall 1 of the casing is mounted a retaining plate 3 which is provided with a flange 4 around its outer edge in which apertures are formed for the reception of screws 5 or other similar securing elements. The retaining plate 3 is raised outwardly from the inner face of the wall 1 of the casing to provide a space 6 for the reception of a shutter 7 which is slightly longer and slightly wider than the slot or opening 2 and is also provided with an extension 8 from its upper edge which is adapted to extend into the extension 9 of the space 6. The extension 8 of the shutter is provided with a pin 10 which extends through a slot 11 formed in the back of the camera and which communicates with the extension 9 of the recess 6. A knob 12 is formed on the end of the pin for facilitating the opening and shutting of the shutter 7. The retaining plate is also provided with an elongated slot 13 which communicates with the slot 2 when the shutter is raised to open position.

In the operation of the device, after a picture has been taken, the rollers are rotated for winding the film upon the rollers so that another picture may be taken on another portion of the film. When the portion of the film which forms the edge of the picture already taken, goes into alinement with the slot 2, the operator will open the shutter which will allow access to the paper cover of the film. By employing a hard pencil or stylus the autographer may scratch his signature upon the paper covering thereby exposing the sensitized film to the light long enough for the impression of the signature to be taken thereon. The shutter will then be immediately closed and not opened again until the next film is brought into position.

From the foregoing it will be observed that a very simple and durable autograph attachment has been provided, the details of which embody the preferred form. I desire it to be understood, however, that slight changes or modifications in the minor details of construction may be made without departing from the spirit of the invention or the scope of the claims hereunto appended.

I claim:

1. An autograph attachment for a camera including the combination with the camera back having a transverse slot and a longitudinal slot formed thereon, of a plate secured to the inner face of said camera back and having its main portion spaced therefrom to form an elongated guideway having an offset central extension, said plate having an opening formed therein opposite the transverse opening of the camera back, a closure plate adapted to slide in the guideway, said closure plate when in normal position resting between the transverse openings of said camera back and said first mentioned plate, said closure plate having an extension adapted to ride in the extension of the guide-way, and means extended through the longitudinal slot of said camera back to operate said closure plate.

2. An autograph attachment for a camera comprising the combination with the camera back having openings at right angles, of a plate secured to the inner side thereof and having its edges offset to space the main portion of the plate from said inner face of the camera back, said plate having an opening formed therein opposite and corresponding to one of the openings in said camera back to expose the covering strip for a film within the camera, a closure plate adapted to slide within the first mentioned plate to close the space between the opening in said first mentioned plate and the opposite opening in said camera back, and means carried by said closure plate and extended through the remaining opening in said camera back to manipulate said closure plate.

3. An autograph attachment for a camera comprising a guide plate adapted to be secured to the inner face of the camera back with the main portion of said guide plate spaced from said camera back, said guide plate having an elongated opening formed therein, the camera back having an elongated transverse opening opposite the opening of said guide plate, a slide mounted in said guide plate to close communication between the openings of said guide plate and said camera back, said slide having an offset extension on one side, said camera back having a second opening extended at right angles to the first mentioned opening, and means carried by said extension of the slide and projecting through the last mentioned opening of the camera back for the purpose of raising and lowering said slide.

In testimony whereof I affix my signature in presence of two witnesses.

DAVID F. CRAWFORD.

Witnesses:
EARL J. BECKER,
F. WM. ROSENAU.

Copies of this patent may be obtained for five cents each, by addressing the "Commissioner of Patents, Washington, D. C."